United States Patent [19]

Tsunemi et al.

[11] Patent Number: 5,080,026

[45] Date of Patent: Jan. 14, 1992

[54] MELTING DISPOSAL METHOD OF SLUDGE

[75] Inventors: Takeshi Tsunemi; Takashi Fujii; Muneharu Ichikawa, all of Osaka, Japan

[73] Assignee: Osaka Gas Co., Ltd., Osaka, Japan

[21] Appl. No.: 544,749

[22] Filed: Jun. 26, 1990

[30] Foreign Application Priority Data

Jun. 27, 1989 [JP] Japan .................................. 1-164337

[51] Int. Cl.⁵ ............................................. F23G 5/04
[52] U.S. Cl. .................................. 110/346; 110/223; 110/224; 110/225
[58] Field of Search ............... 110/223, 224, 221, 225, 110/346

[56] References Cited

U.S. PATENT DOCUMENTS

| | | | |
|---|---|---|---|
| 2,026,366 | 12/1935 | Stehli | 110/224 |
| 3,218,995 | 11/1965 | Yoshihara et al. | 110/225 |
| 4,274,342 | 6/1981 | Nider | 110/246 |
| 4,303,477 | 12/1981 | Schmidt et al. | 110/246 |
| 4,359,006 | 11/1982 | Have | 110/224 |
| 4,561,860 | 12/1985 | Gulley et al. | 110/223 |
| 4,650,546 | 3/1987 | Le Jeune | 110/223 |

FOREIGN PATENT DOCUMENTS 0119079 9/1984 European Pat. Off. .
0294362 7/1988 European Pat. Off. .
0314971 10/1989 European Pat. Off. .

Primary Examiner—Henry C. Yuen
Attorney, Agent, or Firm—Gifford, Groh, Sprinkle, Patmore and Anderson

[57] ABSTRACT

A melting disposal method of sludge. The method of the invention having the steps of collecting a plurality of cakes of dehydrated sludge generated at a plurality of sewage disposal plants at one melting disposal plant; incinerating or drying a substantially fixed amount or proportion of the dehydrated sludge cakes; mixing the resultant substance; and heat-melting the resultant mixture with addition of basicity conditioning agent.

3 Claims, 1 Drawing Sheet

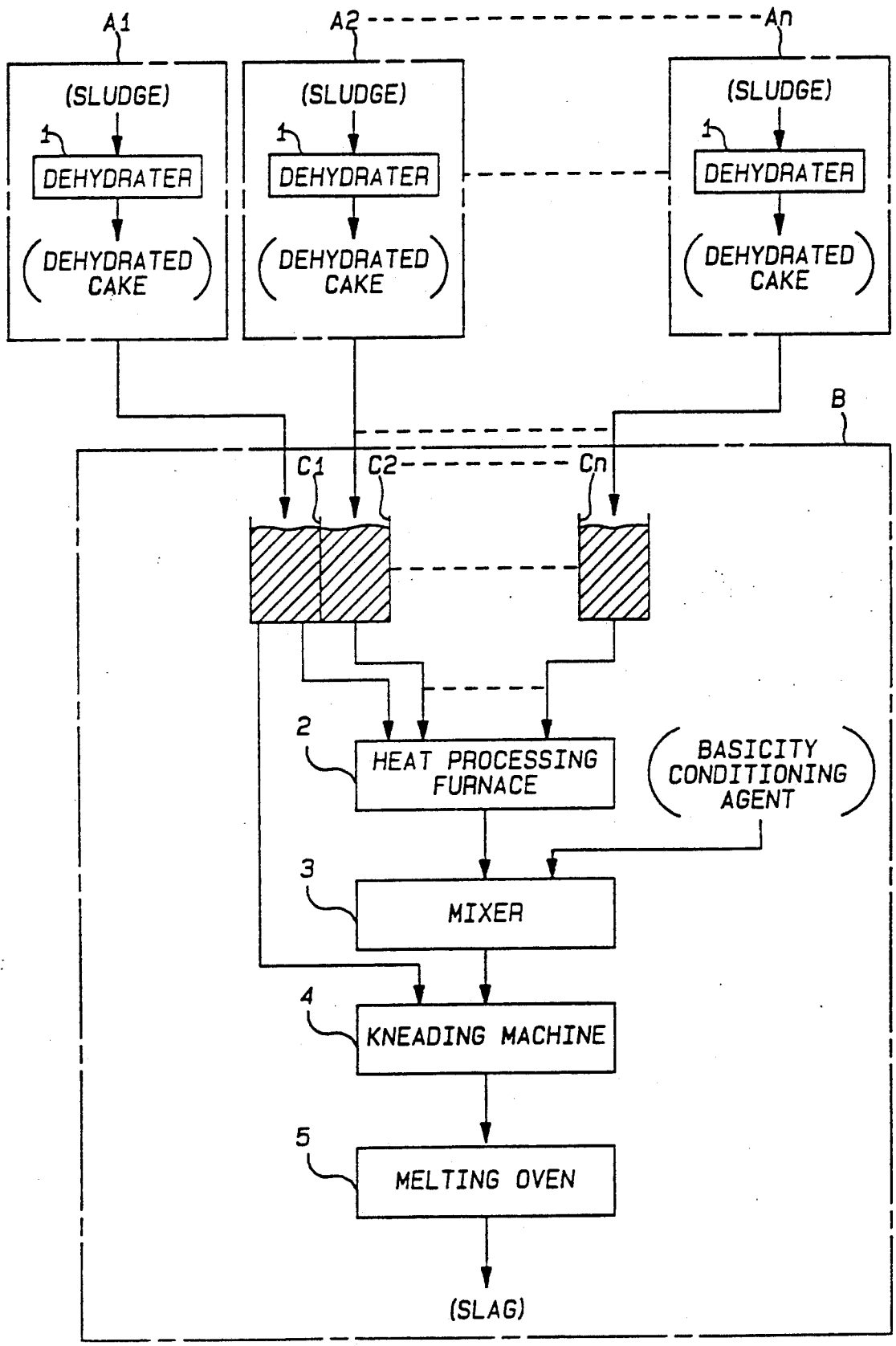

MELTING DISPOSAL METHOD OF SLUDGE

BACKGROUND OF THE INVENTION

1. Field of the Invention

The present invention relates to a melting disposal method of sludge generated at sewage disposal plant.

2. Description of the Related Art

Conventionally, melting disposal of sludge is carried out independently and separately at respective melting disposal equipments installed at sewage disposal plants of different locations.

One obvious problem of this conventional method is the high costs of installing a disposal equipment at each disposal plant.

Another problem is difficulty of stable plant operation due to the inability of coping with great variety of materials mixed in the sludge to be disposed. The prior art has attempted to overcome this problem by the use of basicity conditioning agent. However, if this agent is charged directly into the melting oven, the agent will not uniformly mix with the sludge, thus the agent will fail to achieve drop in the melting point and viscosity of the sludge to such a degree as originally intended.

The primary object of the present invention is to overcome the above drawbacks of the prior method by providing an improved melting disposal method of sludge which enables centralized, melting disposal of sludge generated at a plurality of sewage disposal plants and which assures substantially stable, easy and economical sludge disposal operation regardless of possible changes, such as seasonal changes, and variations in the compositions and properties of the sludge to be disposed.

SUMMARY OF THE INVENTION

For accomplishing the above mentioned object, a melting disposal method of sludge, according to the present invention, comprises the steps of: collecting a plurality of cakes of dehydrated sludge generated at a plurality of sewage disposal plants at one melting disposal plant; incinerating or drying a substantially fixed amount or proportion of the dehydrated sludge cakes; mixing the resultant substance; and heat-melting the resultant mixture with addition of basicity conditioning agent.

Functions and effects of the above-described method will now be described.

According to the above method, sludge generated at a plurality of sewage disposal plants is collected in the form of dehydrated sludge cakes at one melting disposal plant. This centralized disposal significantly reduces the installment and running (e.g. energy consumption) costs of the disposal plants.

Then, the collected cakes are incinerated or dried by a substantially fixed amount or proportion to produce dry-powder-like matter which is ready for uniform mixing treatment. This is advantageous for homogenizing the compositions and properties of the sludge which are subject to e.g. seasonal or local variations and also for allowing uniform and easy addition of the basicity conditioning agent to the sludge. In short, the method allows the addition of the basicity conditioning agent to be effected in a well controlled manner for obtaining desired decrease in the melting point and viscosity of the sludge needed for efficient melting disposal operation.

Consequently, the method of this invention can significantly reduce both installment and running costs of sludge melting disposal plants.

Further and other objects, features and effects of the invention will become more apparent from the following more detailed description of the embodiments of the invention with reference to the accompanying drawing.

BRIEF DESCRIPTION OF THE DRAWING

An accompanying drawing the FIGURE a flow sheet illustrating one preferred embodiment of a melting disposal method of sludge relating to the present invention.

DESCRIPTION OF THE PREFERRED EMBODIMENTS

Preferred embodiments of a melting disposal method of sludge relating to the present invention will now be fully described with reference to the accompanying drawing.

First, sludge generated at a plurality of sewage disposal plants A1, A2, . . . An is formed into dehydrated sludge cakes by means of dehydraters 1 equipped at the respective plants.

Second, the dehydrated sludge cakes are shipped from the sewage disposal plants to and collected at one sludge melting disposal plant B.

At this plant B, the collected cakes are once reserved separately at a plurality of pits C1, C2, . . . Cn. Then, the cakes are charged, by a predetermined fixed amount and proportion, into a heat processing furnace 2 by means of e.g. a grab bucket, so that a substantially fixed amount and proportion of a plurality of kinds of the cakes are incinerated or dried at one time to obtain substance in the form of fine dry powder.

Then, this dry powderly matter is uniformly mixed at a mixer 3 with a basicity conditioning agent comprising e.g. pulverized stone material.

The basicity conditioning agent can contain pulverized stone, silica brick, agalmatolite, or "shirasu" as its $SiO_2$ content and limestone or the like as its CaO content. Also, prior to the heat treatment, the basicity of the pre-treatment material is checked to determine proper amount and kind of basicity conditioning agent to be added. The resultant basicity value should range between 0.5 and 1.5. Especially, it should be noted that basicity value lower than 0.5 will fail to produce sufficiently low viscoity.

Thereafter, the mixture matter obtained through the above mixing step and the dehydrated sludge cake reserved at the pit C1, while controlling total water content of the combination at about 10%, are together charged to a kneading machine 4 by means of e.g. a constant flow feeder.

The resultant matter after the kneading step is heat-molten at a melting oven 5 by its high-temperature hearth formed of carbonate combustive substance such as coke.

In the above melting step, the dehydrated sludge cake, used as an additive, effectively serves as a binder to produce substantially solid mold product, whereby uncontrolled scattering of the fine powderly substance and the basicity conditioning agent inside the melting oven 5 can be advantageously avoided. Consequently, the basicity of the entire substance can be maintained at the proper value.

Alternately, it is conceivable to charge additional basicity conditioning agent to the melting oven 5 together with the mold product. This can assure more reliable control of the basicity value.

The number of the sewage disposal plants A1, A2, ... An can be conveniently selected. Also, the dehydraters 1 used at the respective plants A1, A2, ... An can comprise any conventional type.

The condition and facilities used for reserving the different kinds of dehydrated sludge cakes can vary according to convenience. For instance, the cakes can be reserved at different positions within one pit or at pits or hoppers each equipped a constant flow feeder.

The heat processing furnace 2 can be conveniently selected from those conventionally available. The oven can be either serial processing type or batch processing type.

Further, the mixer 3 can be any one of the conventional mixers, such as of air mixing type or mechanical mixing type, or of serial processing type or batch processing type.

The dehydrated sludge cake charged to the kneading machine 4 can be obtained from any of the sewage disposal plants A1, A2, ... An. Further, the kneading machine can be conveniently selected from the various conventional machines, such as a pelletizer type, screw extruder type, and a serial processing type or butch processing type. Moreover, the shape and dimension of the mold product can vary according to the convenience.

The method of the invention can be embodied with eliminating the kneading molding step. In this case, it is conceivable to charge basicity conditioning agent in the form of grains or pellets to the melting oven 5.

According to the essential spirit of the invention, the type of the melting oven 5 is not particularly limited. For instance, the oven can be of the type having a burner operated by a fluid fuel.

Also, slag material obtained from the melting oven 5 can be processed in any manner.

Next, some sample operations will be described.

Sample Operation 1

Various kinds of sludge (having differing properties and compositions illustrated in Table 1) generated at different sewage disposal plants A1 through A7 were dehydrated at the dehydraters 1 installed at the respective plants to obtain different kinds of dehydrated sludge cakes having compositions shown in Table 2. These cakes are shipped to and collected at one melting disposal plant and temporarily reserved at pits C1 through C7, respectively. In Tables 1 and 2, ash contents are denoted as their percentages present in solid matter after the dehydration. Also, CaO and $SiO_2$ contents comprise percentages with respect to 100% ash contents.

Next, the dehydrated sludge cakes reserved at the respective pits C1 through C7 are charged into one heat processing furnace 2 by means of a grab bucket. Then, the resultant dried cakes are charged into the mixer 3 with addition of basicity conditioning agent having compositions shown in Table 3. And, the cakes and the agent were sufficiently mixed at the mixer 3.

Further, the dehydrated sludge cakes (Table 4 shows the compositions after the dehydration) obtained from the sludge processed through the dehydrater 1 at the sewage disposal plant A1 was charged, as a binder additive, to the kneading machine 4. Thus obtained knead-mold product had compositions shown in Table 4.

Through the above-described processing steps, the resultant mold mixture product had bacisity value of 1.0. Also, during the melting step at the coke oven, the melting point of the mold mixture product was maintained sufficiently low, therefore, the melting operation was reliably carried out in a short time period. Further, the viscosity value was sufficiently low at about 10 poise. Thus, the resultant slug had good fluidity.

Sample Operation 2

This sample operation was carried out through substantially the same processing steps as described in the above Sample Operation 1.

First, sludge having properties and compositions shown in Table 6 were dehydrated to obtain dehydrated sludge cakes having compositions shown in Table 7. These cakes were dried and incinerated at the heat processing furnace. Then, the resultant substance was charged into the mixer together with addition of basicity conditioning agent having compositions shown in Table 8, thereby mixing the same. This mixture was charged to the kneading machine 4 together with binder additive of the dehydrated sludge cakes from the disposal plant A1 (the compositions of the dehydrated cakes are shown in Table 9). The resultant mold mixture product had compositions shown in Table 10.

In this Sample Operation 2, as well as in the foregoing Sample Operation 1, the melting operation by the coke hearth was reliably carried out in a short time period. Also, the obtained slag had sufficiently low viscosity value of about 10 poise.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

TABLE 1

| sewage disposal plants | A1 | A2 | A3 | A4 | A5 | A6 | A7 |
| --- | --- | --- | --- | --- | --- | --- | --- |
| disposal amount | 21 (Ton/D) | 20 | 30 | 30 | 20 | 20 | 30 |
| water content | 71.0 (%) | 77.1 | 71.6 | 66.7 | 66.2 | 72.7 | 60.5 |
| ash content | 43.0 (%) | 44.7 | 23.4 | 36.4 | 28.0 | 28.0 | 38.1 |
| CaO | 30.3 (%) | 41.3 | 9.6 | 49.3 | 47.9 | 36.3 | 45.3 |
| $SiO_2$ | 30.0 (%) | 11.8 | 22.8 | 3.3 | 10.1 | 9.2 | 5.3 |

TABLE 4

|  | (Ton/D) A1 |
| --- | --- |
| solid content | 6.09 |
| water content | 14.91 |
| ash content | 2.62 |
| CaO | 0.79 |
| $SiO_2$ | 0.79 |

TABLE 2

| | (Ton/D) | | | | | |
|---|---|---|---|---|---|---|
| | $A_2$ | $A_3$ | $A_4$ | $A_5$ | $A_6$ | $A_7$ |
| solid content | 4.58 | 8.52 | 9.99 | 6.76 | 3.46 | 11.85 |
| water content | 1.96 | 3.65 | 4.28 | 2.90 | 1.48 | 5.08 |
| ash content | 2.05 | 1.99 | 3.64 | 1.89 | 0.97 | 3.32 |
| CaO | 0.85 | 0.19 | 1.79 | 0.91 | 0.35 | 1.50 |
| $SiO_2$ | 0.24 | 0.45 | 0.12 | 0.19 | 0.09 | 0.18 |

TABLE 3

| | (Ton/D) pulverized stone |
|---|---|
| charge amount | 7.30 |
| CaO | 0.45 |
| $SiO_2$ | 4.77 |

TABLE 5

| | (Ton/D) charge water |
|---|---|
| solid content | 58.55 |
| water content | 34.26 |
| ash content | 23.76 |
| CaO | 6.83 |
| $SiO_2$ | 6.83 |

TABLE 6

| sewage disposal plants | $A_1$ | | $A_2$ | $A_3$ | $A_4$ | $A_5$ | $A_6$ | $A_7$ |
|---|---|---|---|---|---|---|---|---|
| disposal amount | 10.1 | (Ton/D) | 20 | 30 | 30 | 20 | 20 | 30 |
| water content | 71.0 | (%) | 77.1 | 71.6 | 66.7 | 66.2 | 72.7 | 60.5 |
| ash content | 43.0 | (%) | 44.7 | 23.4 | 36.4 | 28.0 | 28.0 | 38.1 |
| CaO | 30.3 | (%) | 41.3 | 9.6 | 49.3 | 47.9 | 36.3 | 45.3 |
| $SiO_2$ | 30.0 | (%) | 11.8 | 22.8 | 3.3 | 10.1 | 9.2 | 5.3 |

TABLE 9

| | (Ton/D) $A_1$ |
|---|---|
| solid content | 2.93 |
| water content | 7.17 |
| ash content | 1.26 |
| CaO | 0.38 |
| $SiO_2$ | 0.38 |

TABLE 7

| | (Ton/D) | | | | | |
|---|---|---|---|---|---|---|
| | $A_2$ | $A_3$ | $A_4$ | $A_5$ | $A_6$ | $A_7$ |
| solid content | 2.05 | 1.99 | 3.64 | 1.89 | 0.97 | 3.32 |
| water content | — | — | — | — | — | — |
| ash content | 2.05 | 1.99 | 3.64 | 1.89 | 0.97 | 3.32 |
| CaO | 0.85 | 0.19 | 1.79 | 0.91 | 0.35 | 1.50 |
| $SiO_2$ | 0.24 | 0.45 | 0.12 | 0.19 | 0.09 | 0.18 |

TABLE 8

| | (Ton/D) pulverized stone |
|---|---|
| charge amount | 7.30 |
| CaO | 0.45 |
| $SiO_2$ | 4.77 |

TABLE 10

| | (Ton/D) charge water |
|---|---|
| solid content | 24.09 |
| water content | 7.17 |
| ash content | 22.42 |
| CaO | 6.42 |
| $SiO_2$ | 6.42 |

What is claimed is:

1. A method for the melting disposal of sludge, comprising the steps of:
   collecting at one melting disposal plant a plurality of dehydrated sludge cakes generated at a plurality of sewage disposal plants;
   incinerating a substantially fixed proportion of said plurality of dehydrated sludge cakes;
   mixing said fixed proportion of said plurality of dehydrated sludge cakes to form a resultant substance;
   adding a predetermined quantity of said plurality of dehydrated sludge cakes to said resultant substance;
   adding a predetermined quantity of a basicity conditioning agent to said resultant substance to form a mixture;
   kneading said mixture to produce a substantially solid mold product; and
   heat-melting said mold product to produce a slag material.

2. The method for the melting disposal as claimed in claim 1, wherein said step of the addition of a predetermined quantity of dehydrated sludge cakes is effected so that a total water content of said mixture is controlled and maintained at about 10% per total content.

3. The method for the melting disposal of sludge as claimed in claim 1, wherein said step of adding a predetermined quantity of a basicity conditioning agent is so selected as to render a basicity value of said mixture ranging between 0.5 and 1.5.

* * * * *